United States Patent Office 3,486,545
Patented Dec. 30, 1969

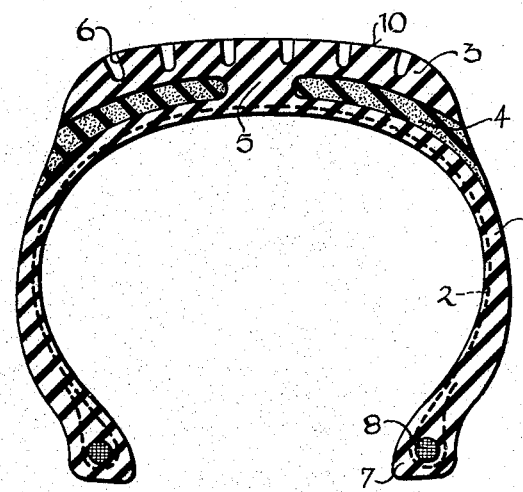
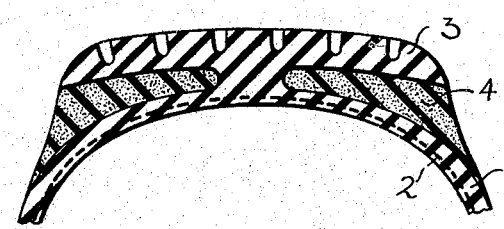
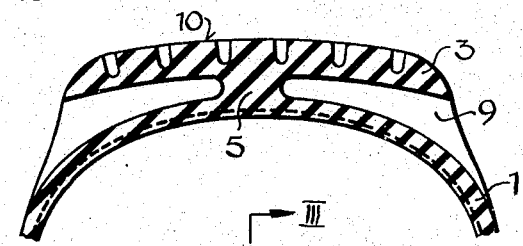
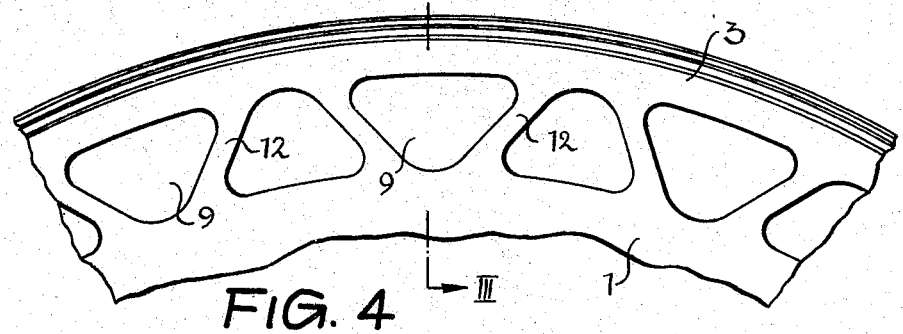

3,486,545
VEHICLE TIRE
Walter Niclas, Altwarmbuchen, and Hermann Wittneben, Hannover, Germany, assignors to Continental Gummi-Werke AG, Hannover, Germany
Filed Mar. 27, 1967, Ser. No. 626,167
Claims priority, application Germany, Mar. 31, 1966, C 38,659
Int. Cl. B60c *13/00*
U.S. Cl. 152—155                  2 Claims

ABSTRACT OF THE DISCLOSURE

The present invention relates to a vehicle tire which has a tread strip arranged on the peripheral outside of the carcass and in which said tread strip is directly connected to the carcass by an angular web-shaped portion extending radially inwardly from a centrally located tread strip portion to said carcass while on opposite sides of said annular web-shaped portion there are provided cushioning portions extending from said web-shaped portion in the direction toward the side walls of the tire.

---

The present invention relates to a vehicle tire with a cushioning layer interposed between the carcass and the tread strip and intended to cushion the shocks exerted upon the tire by the road and to convey the cushioned shocks to the carcass and thereby the frame of the vehicle. This cushioning layer can, with heretofore known tires, be made elastic to a limited extent only, because with the complete separation of the tread strip from the carcass by an embedded cushioning layer, the lateral forces active when driving through a curve, and the driving and braking forces are too softly transmitted by the cushioning layer. These cushioning layers, therefore, are not suitable to keep oscillations of a high frequency away from the frame of the vehicle, for instance, oscillations which occur as driving noises.

Other heretofore known cushioning layers are completely enclosed between the tread strip and the carcass and thus have at both shoulders a bridge made of the material of the tire, which bridge transfers the oscillations of high frequencies in an uncushioned way.

It is, therefore, an object of the present invention to provide a tire with embedded cushioning layer, which will overcome the above mentioned drawbacks.

It is another object of this invention to provide a tire with embedded cushioning layer, in which the driving noises caused by the rolling movement of the tire will be cushioned to a considerable extent.

These and other objects and advantages of the invention will appear more clearly from the following specification, in connection with the accompanying drawing, in which:

FIGURE 1 is a section along a radial plane through a tire according to the invention with a cushioning layer of uniform thickness.

FIGURE 2 shows a tire according to FIG. 1, but with a cushioning layer which increases in thickness toward the sides.

FIGURE 3 shows a section of a tire according to FIG. 1 with laterally open recesses, said section being taken along the line III—III of FIG. 4.

FIGURE 4 is a side view of the tire according to FIG. 3.

The vehicle tire according to the present invention is characterized primarily in that the tread strip is connected to the carcass solely by a web located in the circumferential central plane of the tire while the cushioning layer divided by the said web consists of oscillation absorbing homogeneous or cellular material.

In view of the provision of the said web, the cushioning layer is two-sectional while a direct connection is established between the tread strip and the carcass. The driving properties with regard to lateral stability and the absorption of circumferential forces is hardly affected while rather soft material can be used as cushioning layer which will greatly dampen or cushion the oscillations producing the driving noises.

Furthermore, in view of the provision of the web in the circumferential central plane of the tire, a transfer of the oscillations in direct direction is impossible because the direction of oscillations from the tread strip to the web and from the latter to the side walls of the tire have to change direction several times.

According to one embodiment of the invention, the cushioning layer on each side of the tire is increasing in thickness from the web to the tire shoulders so that in particular in the vicinity of the tire shoulders where a direct transfer of the oscillations into the side walls of the tire is most undesired, the greatest cushioning action will be obtained. In this connection it is advantageous that the inner confining surface of the cushioning layer which surface faces the central tire axis is parallel to the tire inner wall and that the outer confining cushioning layer which faces the tread surface of the tire is parallel to said tread surface.

With a design of the above mentioned type, the carcass can extend with the same thickness to the web, and the tread strip can have the same thickness throughout so that when building up the tire of plates, cut starting material can be employed.

According to a still further development of the present invention, the cushioning layer may be formed from the homogeneous material of the tire having provided therein a plurality of lateral open recesses. The walls between the recesses are kept so thin that the cushioning of the layer provided with the recesses is approximately of the same magnitude as if particularly cushioning-capable material were employed.

Referring now to the drawings in detail, in all figures, the carcass 1 of the tire is in customary manner reinforced by fabric layers 2, whereas the tread strip is designated with the reference numeral 3. A cushioning layer 4 is located between the carcass 1 and the tread strip 3 and is subdivided by the web 5 which extends all the way around in the central circumferential plane of the tire and directly connects the carcass 1 to the tread strip 3. Web 5 consists primarily of a material which is the same that is used for the carcass, in other words, a material which has a high elasticity. Such material may, for instance be substantial natural rubber. The tread strip 3 is usually made of a material having a high wear-resistance, for instance of substantial synthetic rubber.

The tire can in customary manner be provided with a profile groove 6, while core rings 8 in the beads 7.

In the particular embodiment shown in FIG. 1, the cushioning layer 4 has the same thickness throughout, whereas the tread strip 3 increases in thickness toward the sides.

According to the embodiment of FIG. 2, the cushioning layer 4 increases in thickness toward the sides while the carcass 1 may be built up of layers of the same thickness. The cushioning layer 4 is made of a material which is adapted to cushion particularly oscillations of high frequency. Such materials may, for instance be cellular rubber.

The arrangement of FIGS. 3 and 4 shows a further modification according to which the oscillation cushioning layer is replaced by the provision of recesses 9 which starting from the web 5 lead and open toward the sides of the tire. The recesses 9 are in the direction toward the tread surface 10 confined by the tread strip 3, whereas in the direction to the central circumferential axis of the tire they are confined by the carcass 1 and are laterally confined by the outer surfaces of the wall 12. The wall portions 12 are, as is evident from FIG. 4, arranged at an incline so that the oscillations cannot be transferred to the side walls of the tires in radial direction.

The number of the recesses 9 and the position of the wall portions 12 may vary as long as the wall portions 12 are not directed radially.

It is, of course, to be understood that the present invention is, by no means, limited to the particular embodiments shown in the drawing.

What we claim is:

1. A vehicle pneumatic tire having a pair of laterally spaced rim-mountable side walls and comprising: a central carcass portion including the side walls, a tread strip portion arranged peripherally outwardly of said carcass portion, an annular continuous web-shaped portion connected to extend radially inwardly from said tread strip portion at a location directly centrally between said carcass portion and said tread strip portion, said continuously web-shaped portion being exclusively dimensionally adapted as the only positive direct force interconnection solidly between said tread strip portion and said carcass portion at said location which is laterally intermediate the rim-mountable side walls free of direct force interconnection particularly exactly radially outwardly with respect to said tread strip portion, and shock cushioning portions on opposite sides of said annular web-shaped portion and formed by oscillation absorbing homogeneous cellular material adapted particularly to dissipate high frequency oscillations dampened in multiple directions therein obviating possibility of direct radial transfer of high frequency oscillations from said tread strip portion radially to the laterally placed side walls of said central carcass portion, said continuous web-shaped portion solidly assuring laterally wobble-free relationship between said central carcass portion and said tread strip portion while said shock cushioning portions serve only slightly for maintaining shape of said tread strip portion particularly in rest position free of wavy form.

2. A vehicle tire according to claim 1, in which said cushioning portions along inner surface adjacent to said carcass portion are substantially parallel thereof and along that surface adjacent to said tread strip portion are substantially parallel thereto so that said cushioning portions increase in thickness laterally and radially outwardly between said tread strip portion and the side walls of said carcass portion, and inclined portions integral with said tread strip portion and said carcass portion divergent from radial direction between said tread strip portion and said carcass portion, said inclined portions defining alternately radially inwardly and outwardly directed triangular cavities filled with said shock cushioning portions bonded thereto so that both said inclined portions and said shock cushioning portions dissipate high frequency oscillations in multiple directions other than direct radial noise transfer.

References Cited

UNITED STATES PATENTS

| 887,997 | 5/1908 | Cadwell | 152—325 |
| 1,524,177 | 1/1925 | Granville | 152—324 |
| 1,813,758 | 7/1931 | Paridy | 152—324 |
| 2,303,164 | 11/1942 | Hawkinson | 152—352 |
| 3,208,497 | 9/1965 | Schutt | 152—157 |

FOREIGN PATENTS

| 2,736 | 1908 | Great Britain. |
| 1,726 | 1914 | Great Britain. |

ARTHUR L. LA POINT, Primary Examiner
CHARLES B. LYON, Assistant Examiner

U.S. Cl. X.R.

152—323